United States Patent
Chang et al.

(10) Patent No.: US 12,304,433 B1
(45) Date of Patent: May 20, 2025

(54) WINDSHIELD WIPER ASSEMBLY STRUCTURE

(71) Applicant: DANYANG UPC AUTO PARTS CO., LTD., Jiangsu (CN)

(72) Inventors: Che-Wei Chang, New Taipei (TW); Cheng-Kai Yang, New Taipei (TW); Chuan-Chih Chang, New Taipei (TW)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 18/505,897

(22) Filed: Nov. 9, 2023

(51) Int. Cl.
*B60S 1/38* (2006.01)

(52) U.S. Cl.
CPC ........... *B60S 1/3801* (2013.01); *B60S 1/3886* (2013.01); *B60S 1/3891* (2013.01); *B60S 1/3894* (2013.01); *B60S 2001/3822* (2013.01)

(58) Field of Classification Search
CPC .... B60S 1/3801; B60S 1/3886; B60S 1/3887; B60S 1/3889; B60S 1/3891; B60S 1/3893; B60S 1/3894; B60S 1/3879; B60S 2001/3813; B60S 2001/3822
USPC ........ 15/250.44, 250.451, 250.452, 250.453, 15/250.454
See application file for complete search history.

(56) References Cited

U.S. PATENT DOCUMENTS

| | | | | |
|---|---|---|---|---|
| 2,983,945 A | * | 5/1961 | De Pew | ................ B60S 1/3801 15/250.454 |
| 3,153,254 A | | 10/1964 | Lenz et al. | |
| 3,940,823 A | * | 3/1976 | Rosenbeck | ........... B60S 1/3801 15/250.454 |

FOREIGN PATENT DOCUMENTS

| | | | | |
|---|---|---|---|---|
| DE | 4325615 A1 | * | 2/1995 | ............ B60S 1/3801 |
| EP | 943511 A2 | * | 9/1999 | ............ B60S 1/3801 |
| FR | 1503863 A | * | 10/1967 | |
| GB | 2036547 A | * | 7/1980 | ................ B60S 1/38 |
| GB | 2336293 A | | 10/1999 | |

OTHER PUBLICATIONS

Partial Search Report dated Apr. 29, 2024 of the corresponding European patent application No. 23209899.6.

* cited by examiner

*Primary Examiner* — Gary K. Graham
(74) *Attorney, Agent, or Firm* — Chun-Ming Shih; HDLS IPR SERVICES (57) ABSTRACT

A windshield wiper assembly structure includes a wiper holder, a wiper blade, elastic sheets, and clamping seats. The wiper holder includes two outer buckling brackets. Each outer buckling bracket includes a through groove and an opening. The wiper blade includes a penetrating portion and a scraping portion. The penetrating portion is inserted in the through grooves. The penetrating portion includes a central column and a first slot. The elastic sheets are respectively inserted to first slots. Each elastic sheet is attached to the central column and abuts against the outer buckling brackets. The clamping seats are fixed on ends of the wiper blade. Each clamping seat includes a pair of clipping plates and clamped by the outer buckling brackets. Each clipping plate includes a protruding thorn and inserted to the first slot to abut against the elastic sheets. The protruding thorn passes through the central column.

13 Claims, 7 Drawing Sheets

WINDSHIELD WIPER ASSEMBLY STRUCTURE

BACKGROUND OF THE DISCLOSURE

Technical Field

The technical field relates to a windshield wiper, and more particularly relates to a windshield wiper assembly structure.

Description of Related Art

A windshield wiper mainly includes a snap-clip adapter, a wiper frame, metal elastic sheets and a rubber blade, etc. The snap-clip adapter is installed on the wiper frame to be combined with a wiper arm. Additionally, the metal elastic sheets and the rubber blade are combined on the wiper frame, and the rubber blade is clamped and fixed by the metal elastic sheets and the wiper frame. Accordingly, the wiper arm is combines with the snap-clip adapter and drives the rubber blade to clean the windshield.

However, the clamping and fixing method of the aforementioned rubber blade is not firm. Thus, the rubber blade is easily to be disengaged or be pulled out from the side. Besides, the wiper blade may be deteriorated, deformed, or displaced after being used for a period of time, and that may cause the rubber blade to be not able to attach the windshield firmly, thereby affecting the cleaning effectiveness of the windshield wiper.

In view of the above drawbacks, the inventor proposes this disclosure based on his expert knowledge and elaborate researches in order to solve the problems of related art.

SUMMARY OF THE DISCLOSURE

One object of this disclosure is to provide a windshield wiper assembly structure to prevent disengagement or displacement of the wiper blade, thereby providing a firm and solid windshield wiper assembly structure.

This disclosure is a windshield wiper assembly structure including a wiper holder, a wiper blade, a pair of elastic sheets and a pair of clamping seats. The wiper holder includes a main frame and a pair of outer buckling brackets connected to the main frame. Each outer buckling bracket includes a through groove and an opening communicating to the through groove. The wiper blade extends along the main frame and includes a penetrating portion and a scraping portion connected to the penetrating portion. The penetrating portion is inserted in the through grooves of the pair of outer buckling brackets. The penetrating portion includes a central column, and two first slots are respectively defined on two sides of the central column. The scraping portion protrudes from the opening. The pair of elastic sheets extend along the wiper blade and are respectively inserted in the first slots on two sides of the central column. One side of each elastic sheet is attached to the central column, and another side of the elastic sheet abuts against the pair of outer buckling brackets. The pair of clamping seats are fixed on two ends of the wiper blade. Each clamping seat includes a pair of clipping plates connected with each other and is clamped by the pair of the outer buckling brackets. The pair of clipping plates respectively include a protruding thorn protruding in a horizontal direction and facing each other. The pair of clipping plates are inserted in the first slots on two sides of the central column from one end of the wiper blade to abut against the pair of the elastic sheets. The protruding thorn of each clipping plate passes through the central column.

In one embodiment of this disclosure, two snapping holes are respectively defined on two ends of each elastic sheet on a side away from the central column thereof, and each clipping plate includes a blocking portion to be engaged in the snapping hole.

In one embodiment of this disclosure, the blocking portion includes a tab extending obliquely from a surface of each clipping plate toward the elastic sheet.

In one embodiment of this disclosure, a notch is defined on a side of each clipping plate, and each outer buckling bracket is fastened to the notch of each clipping plate.

In one embodiment of this disclosure, each clipping plate includes a hook located on an end thereof and adjacent to the notch.

In one embodiment of this disclosure, the clipping plate has elastic restoring force. The hook is elastically pressed by the outer buckling bracket, and the clipping plate is positioned on the notch through elastic restoring force when the hook passes through the outer buckling brackets.

In one embodiment of this disclosure, a recess is defined on one side of the protruding thorn of the clipping plate and adjacent to the protruding thorn of another clipping plate.

In one embodiment of this disclosure, the clamping seat further includes a baffle and a pair of side plates perpendicularly connected to the clipping plates. The baffle is connected to one end of the pair of clipping plates, and the pair of side plates are located on opposite two outer sides of the pair of clipping plates.

In one embodiment of this disclosure, each clamping seat further includes a pair of buckling plates arranged perpendicularly to the baffle, a buckling slot is defined on each of the side plates, one end of each buckling plate is connected to the baffle, and another end of each buckling plate is clamped in the buckling slot.

In one embodiment of this disclosure, each buckling plate is an L-shaped plate.

In one embodiment of this disclosure, the penetrating portion includes two second slots respectively defined on two sides of the central column, the second slot is located between the first slot and the scraping portion, and each buckling plate is located in the second slot.

This disclosure is a windshield wiper assembly structure including a wiper holder, a wiper blade, a pair of elastic sheets and a pair of clamping seats. The wiper holder includes a main frame and a pair of outer buckling brackets connected to the main frame. Each outer buckling bracket includes a through groove and an opening connected to the through groove. The wiper blade includes a penetrating portion and a scraping portion connected to the penetrating portion. The penetrating portion is inserted in the through grooves of the pair of the outer buckling brackets. A pair of first slots are defined on the penetrating portion, and the scraping portion protrudes from the opening. The pair of elastic sheets are respectively inserted in the first slots. One side of each elastic sheet is attached to the wiper blade, and another side of the each elastic sheet abuts against the pair of outer buckling brackets. The pair of clamping seats are fixed on two ends of the wiper blade. Each clamping seat includes a pair of clipping plates clamped by the pair of the outer buckling brackets, a baffle and a pair of side plates connected to the clipping plates. A pair of buckling plates are extended perpendicularly to the baffle. The pair of clipping plates are inserted in the first slots from one end of the wiper blade to abut against the pair of the elastic sheets. The baffle is connected to one end of the pair of clipping plates, and a buckling slot is defined on each side plate. One end of each buckling plate is connected to the baffle, and another end of each buckling plate is clamped in the buckling slot.

In one embodiment of this disclosure, two snapping holes are respectively defined on two ends of each of the elastic sheets, and each clipping plate includes a blocking portion to be engaged in the snapping hole.

In one embodiment of this disclosure, the blocking portion includes a tab extending obliquely from a surface of the clipping plate toward the elastic sheet.

In one embodiment of this disclosure, a notch is disposed on a side of each clipping plate, and each outer buckling bracket is fastened to the notch of each clipping plate.

In one embodiment of this disclosure, the clipping plate includes a hook located on an end thereof, and the hook is disposed adjacent to the notch.

In one embodiment of this disclosure, the clipping plate has elastic restoring force. The hook is elastically pressed by the outer buckling bracket, and the clipping plate is positioned on the notch through elastic restoring force when the hook passes through the outer buckling bracket.

In one embodiment of this disclosure, the pair of clipping plates respectively comprises a protruding thorn protruding in a horizontal direction and facing each other, and a recess is defined on one side of the protruding thorn of the clipping plate and adjacent to the protruding thorn of another clipping plate.

In one embodiment of this disclosure, each buckling plate is an L-shaped plate.

In comparison with the related art, the clamping seat of the windshield wiper assembly structure of this disclosure is inserted in the first slot located on two sides of the central column from one end of the wiper blade to make the protruding thorn of the clipping plate pass through the central column, and the outer buckling brackets may be fastened to the notch of each clipping plate. Furthermore, the blocking portion of the clipping plate may be engaged in the snapping hole of the elastic sheet. As a result, the wiper blade is fastened and positioned through the clamping seats to prevent disengagement or displacement, and the windshield wiper assembly structure is firm and solid to have a longer service life.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 4, which are a perspective schematic view of the windshield wiper assembly structure in this disclosure, two partially enlarged schematic views of the windshield wiper assembly structure from two sides thereof in this disclosure, and a perspective exploded schematic view of the windshield wiper assembly structure in this disclosure. This disclosure is a windshield wiper assembly structure 1 including a wiper holder 10, a wiper blade 20, a pair of elastic sheets 30 and a pair of clamping seats 40. The wiper blade 20 and the pair of elastic sheets 30 are combined on the wiper holder 10. The pair of clamping seats 40 are inserted on two ends of the wiper blade 20 and clamp the wiper blade 20 and the pair of elastic sheets 30 to prevent disengagement or displacement of the wiper blade 20, thereby providing a firm and solid windshield wiper assembly structure 1.

The wiper holder 10 includes a main frame 11 and a pair of outer buckling brackets 12 connected to the main frame 11. Each outer buckling bracket 12 includes a through groove 121 and an opening 122 communicating to the through groove 121.

In one embodiment of this disclosure, the wiper holder 10 further includes a pair of auxiliary frames 13 pivotally connected to two ends of the main frame 11. Additionally, the pair of auxiliary frames 13 are further pivotally connected with a plurality of buckling arms 14. Each buckling arm 14 is combined with a buckling bracket 15 on the end thereof. In more detail, a plurality of buckling brackets 15 are disposed spacedly on the bottom side of the main frame 11 and the pair of auxiliary frames 13, and the outermost two buckling brackets 15 are defined as outer buckling brackets 12.

The wiper blade 20 extends along the main frame 11 to outer sides of two outer buckling brackets 12. The wiper blade 20 includes a penetrating portion 21 and a scraping portion 22 connected to the penetrating portion 21. The penetrating portion 21 is inserted in the through grooves 121 of the pair of outer buckling brackets 12. The penetrating portion 21 includes a central column 211, and a first slot 212 is respectively disposed on both sides of the central column 211. The scraping portion 22 protrudes from the opening 122.

The elastic sheet 30 is a metal sheet. The pair of elastic sheets 30 extend along the wiper blade 20 and are respectively inserted in the first slots 212 on two sides of the central column 211. Additionally, a snapping hole 31 is respectively disposed on two ends of each elastic sheet 30.

Moreover, the clamping seat 40 is a metal piece. The pair of clamping seats 40 are fixed on two ends of the wiper blade 20. More detailed of the structure of the clamp seat 40 is as follows.

Figure 5:
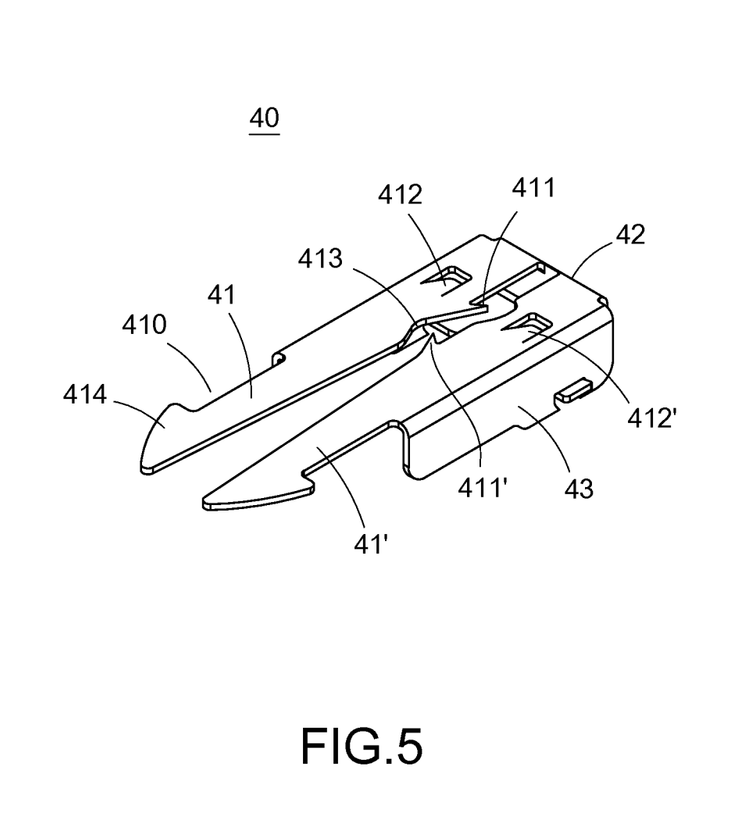
FIG. 5 and FIG. 6 are perspective schematic views of the clamping seat from two sides thereof in this disclosure.
Figure 6:
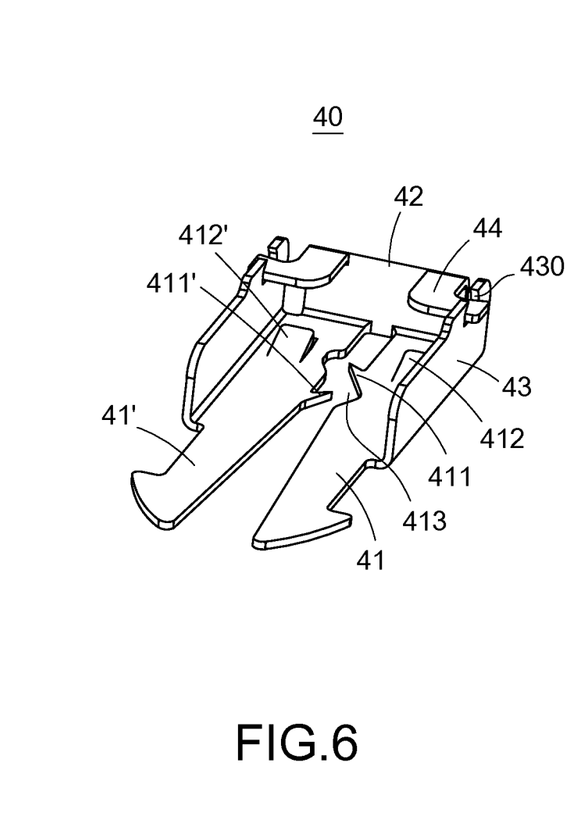

Please further refer to FIG. 5 and FIG. 6, which are perspective schematic views of the clamping seat from two sides thereof in this disclosure. Each clamping seat 40 includes a pair of clipping plates 41, 41' connected with each other, and the pair of clipping plates 41, 41' include the protruding thorns 411, 411' protruding in a horizontal direction and facing each other (on opposite sides thereof). Additionally, a notch 410 is defined on a side of each clipping plate 41, 41'. Each clipping plate 41, 41' includes a blocking portion 412 to be engaged in the snapping hole 31 of each elastic sheet 30 (further refer to FIG. 8). The blocking portion 412 includes a tab extending obliquely from a surface of the clipping plate 41, 41' toward the elastic sheet 30.

Accordingly, the pair of clipping plates 41, 41' are inserted in the first slots 212 located on two sides of the central column 211 from one end of the wiper blade 20 to abut against the pair of the elastic sheets 30, and the protruding thorn 411, 411' of each clipping plate 41, 41' passes through the central column 211. Furthermore, each outer buckling bracket 12 is fastened to the notch 410 of each clipping plate 41 (further refer to FIG. 8).

Specifically, the clamping seat 40 includes a pair of clipping plates 41, 41' connected with each other, a baffle 42 perpendicularly connected to the clipping plates 41, 41' and a pair of side plates 43. The baffle 42 is connected to one end of the pair of clipping plates 41, 41'. The pair of side plates 43 are located on opposite two outer sides of the pair of clipping plates 41, 41'. Additionally, a protruding thorn 411 and a blocking portion 412 are disposed on one of the clipping plates 41, 41' of the clamp base 40, and a protruding thorn 411' and a blocking portion 412' are disposed on another clipping plate 41' of the clamp seat 40.

Here, the structure of the clipping plate 41 of the clamping seat 40 is described as follows. A recess 413 is defined on one side of the protruding thorn 411 of the clipping plate 41 and adjacent to the protruding thorn 411' of another clipping plate 41'. Additionally, the clipping plate 41 includes a hook 414 located on an end thereof and is adjacent to the notch 410. The disposition of the hook 414 may facilitate the protruding thorn 41 passing through the wiper blade 20, thereby increasing the convenience of assembly.

Moreover, the clamping seat 40 further includes a pair of buckling plates 44 arranged perpendicularly to the baffle 42. A buckling slot 430 is defined on the side plates 43. One end of the buckling plate 44 is connected to the baffle 42, and another end of the buckling plate 44 is clamped in the buckling slot 430. In this embodiment, each buckling plate 44 is an L-shaped plate It should be noted that the disposition of the baffle 42 may prevent over passing through the rubber strip 20 during the installation of the clamp base 40. Additionally, the baffle 42 blocks one side of the rubber strip 20 and the pair of elastic pieces 30 to prevent the rubber strip 20 and the pair of elastic pieces 30 from being displaced and out of position (see also FIG. 3). Moreover, the disposition of the buckling plate 44 is provided to position the side plate 43 to prevent the side plate 43 from being displaced when impacted by external force, thereby preventing the rubber strip 20 from disengaging.

Figure 7:
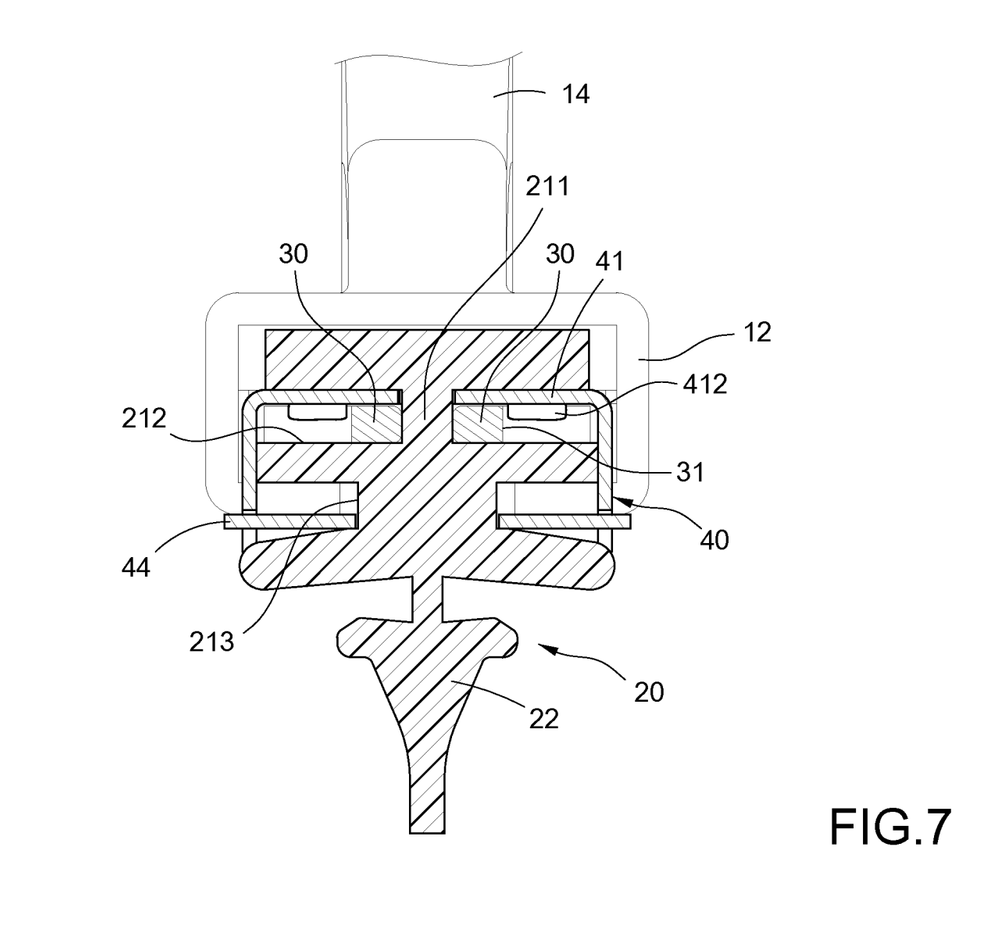
FIG. 7 and FIG. 8 are cross sectional views of the windshield wiper assembly structure from two sides thereof in this disclosure.
Figure 8:
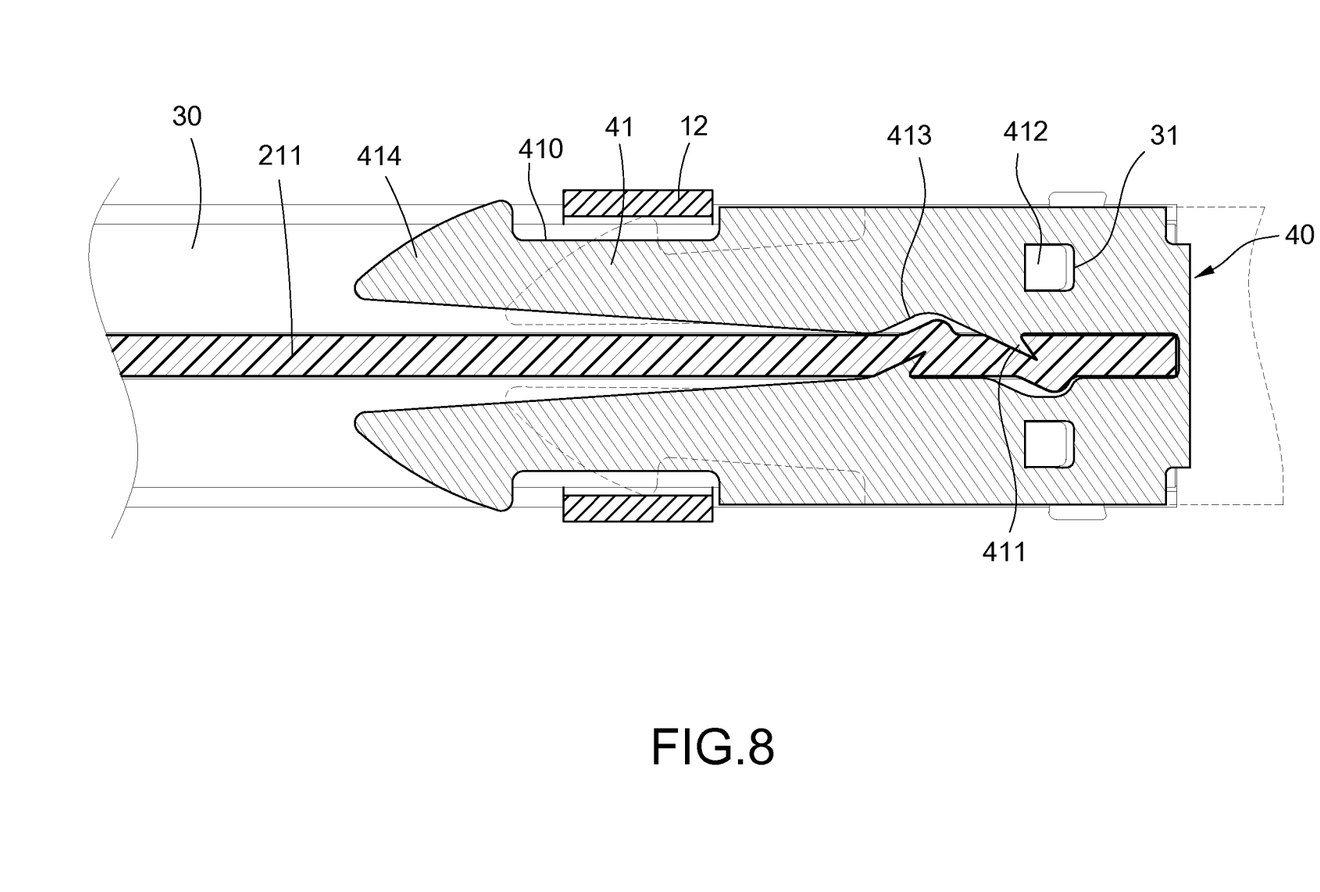

Please further refer to FIG. 7 and FIG. 8, which are cross sectional views of the windshield wiper assembly structure from two sides thereof in this disclosure. In the windshield wiper assembly structure 1 of this disclosure, the wiper blade 20 is positioned by the pair of clamping seats 40 combined on two ends thereof. As a result, the wiper blade 20 may be combined on the wiper holder 10 firmly.

Figure 1:
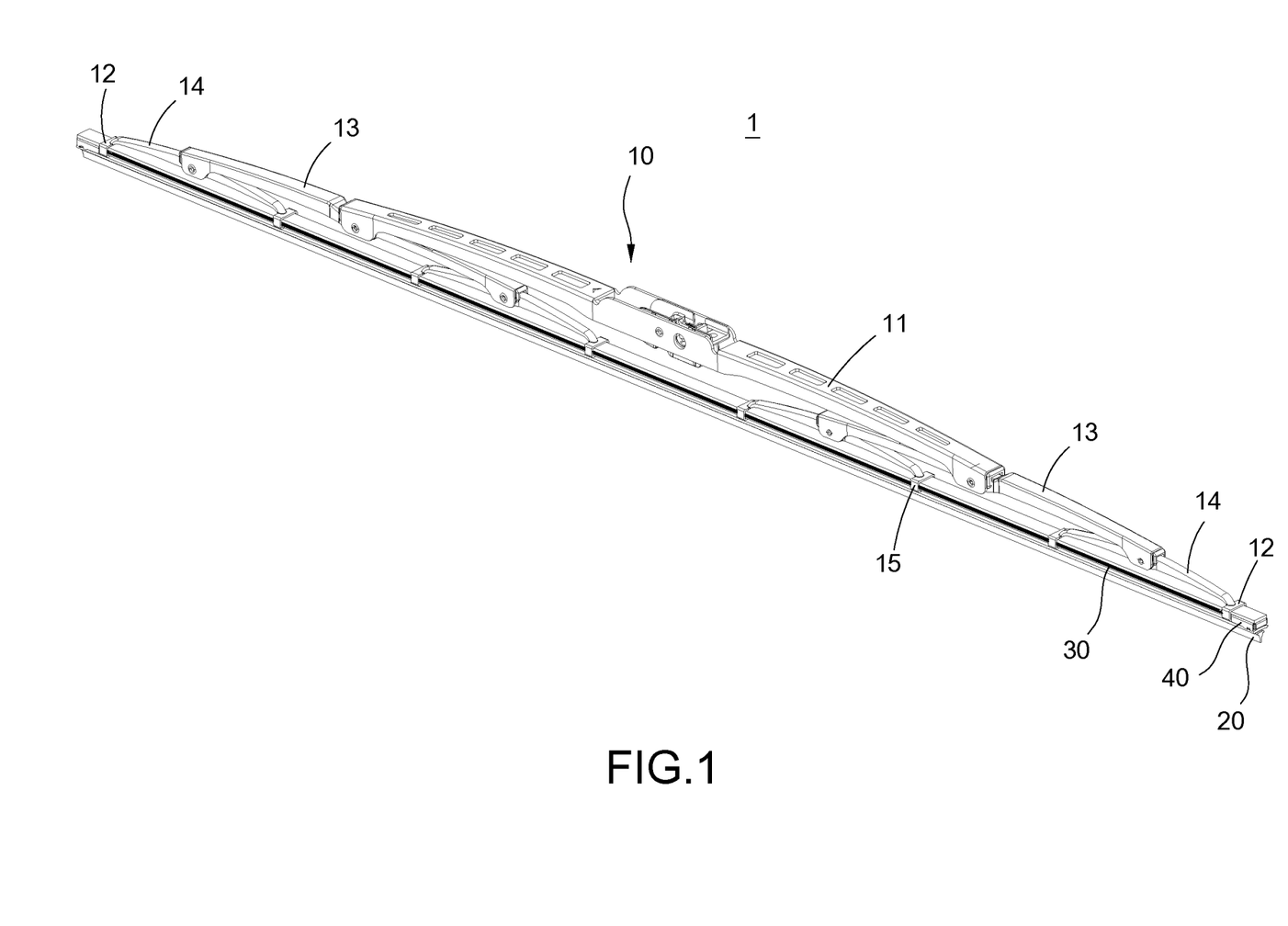
FIG. 1 is a perspective schematic view of the windshield wiper assembly structure in this disclosure.
Figure 2:
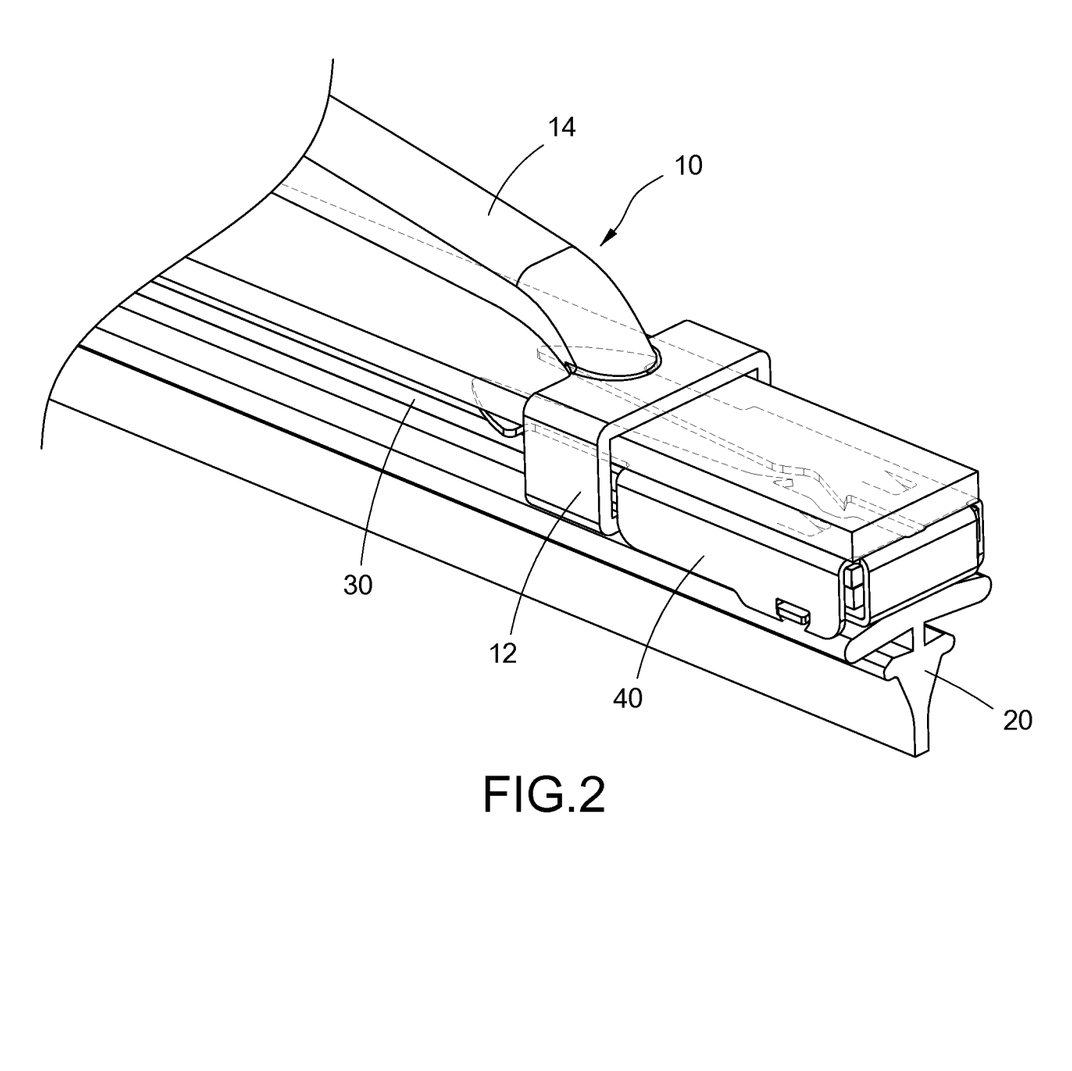
FIG. 2 and FIG. 3 are partially enlarged schematic views of the windshield wiper assembly structure from two sides thereof in this disclosure.
Figure 3:
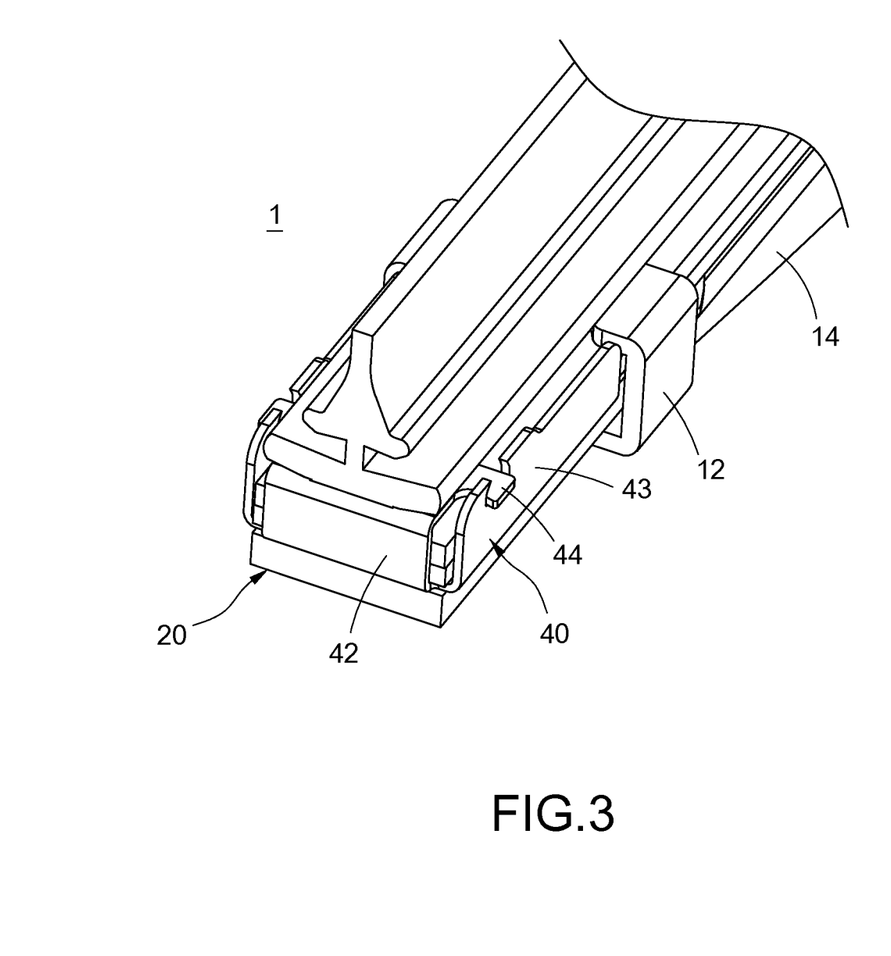
Figure 4:
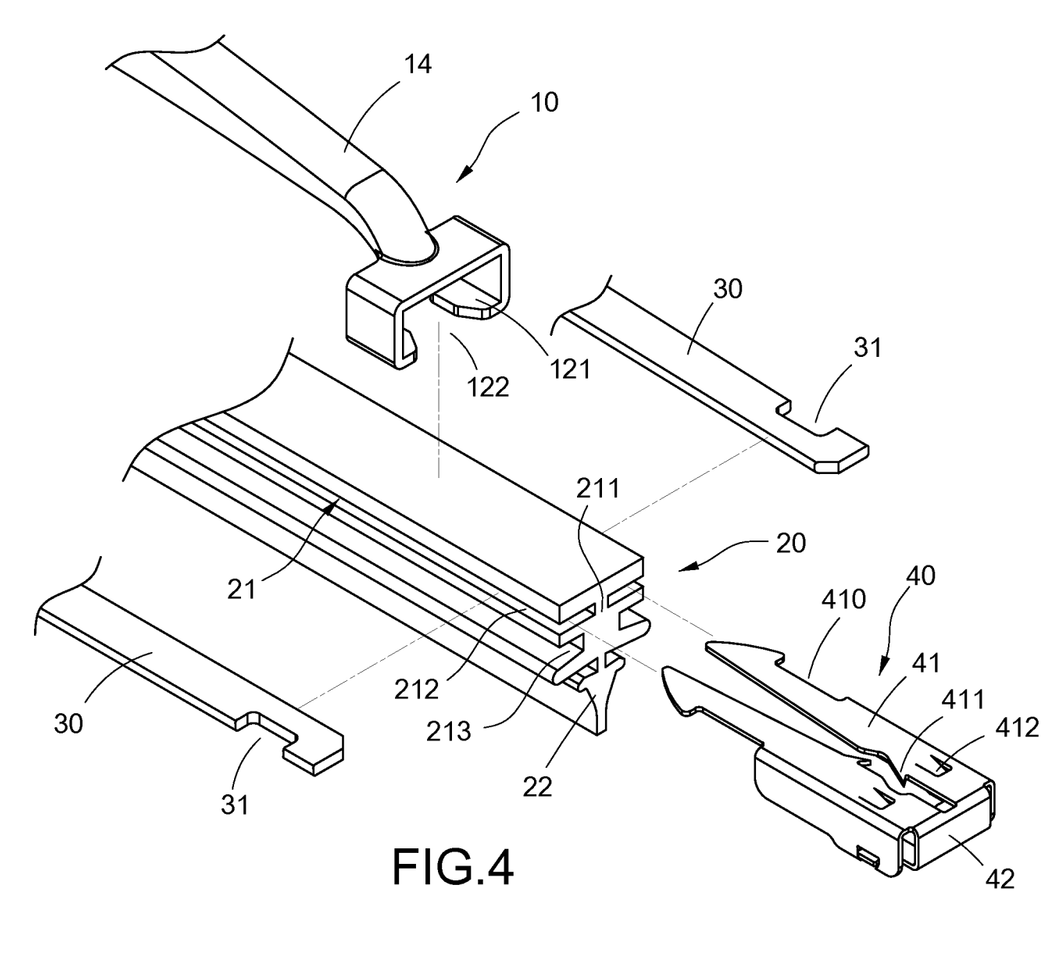
FIG. 4 is a perspective exploded schematic view of the windshield wiper assembly structure in this disclosure.

Further, the wiper blade 20 passes through the buckling brackets 15 of each buckling arm 14 and extends to the outer of the two outer buckling brackets 12 (further refer to FIG. 1). The elastic sheet 30 is inserted in the first slot 212 of the wiper blade 20. Additionally, the clamp seat 40 is inserted in the first slot 212 from the end of the wiper blade 20 through the clipping plate 41 and abuts against the pair of the elastic sheets 30. One side of the elastic sheet 30 is attached to the central column 211 of the wiper blade 20, and another side of the elastic sheet 30 abuts against the outer buckling brackets 12.

Moreover, the penetrating portion 21 of the wiper blade 20 further includes a second slot 213 respectively located on two sides of the central column 211. The second slot 213 is located between the first slot 211 and the scraping portion 22. After the clipping plate 41 of the clamping seat 40 passes through the first slot 212 of the wiper blade 20, each buckling plate 44 is located in the second slot 213 (see FIG. 7).

It is worth of noticing that when the clamping seat 40 is inserted in the first slot 212, the protruding thorn 411 of the clipping plate 41 pass through the central column 211. Then, the central column 211 is pushed by the protruding thorn 411 and a part of the material moves into the recess 413 located on the rear side of the protruding thorn 411 (see FIG. 8). The disposition of the recess 413 may facilitate the clamping seat 40 inserting into the first slot 212 when installing the clamp base 40.

It is worth noticing that the clipping plate 41 has elastic restoring force. The hook 414 is elastically pressed by the outer buckling bracket 12, and the clipping plate 41 is positioned on the notch 410 through elastic restoring force when the hook 414 passes through the outer buckling bracket 12. As a result, the outer buckling bracket 12 clamps the clipping plate 41 to ensure that the wiper blade 20 may not be disengaged from positioning.

While this disclosure has been described by means of specific embodiments, numerous modifications and variations could be made thereto by those skilled in the art without departing from the scope and spirit of this disclosure set forth in the claims.

What is claimed is:

1. A windshield wiper assembly structure, comprising:
 a wiper holder, comprising a main frame and a pair of outer buckling brackets connected to the main frame, each outer buckling bracket comprising a through groove and an opening communicating to the through groove;
 a wiper blade, extending along the main frame, comprising a penetrating portion and a scraping portion connected to the penetrating portion, the penetrating portion inserted in multiple through grooves of the pair of outer buckling brackets, the penetrating portion comprising a central column and two first slots defined on two sides of the central column, and the scraping portion protruding from the opening;
 a pair of elastic sheets, extending along the wiper blade and respectively inserted in the first slots on the two sides of the central column, one side of each elastic sheet attached to the central column, and another side of the each elastic sheet abutting against the pair of outer buckling brackets; and
 a pair of clamping seats, fixed on two ends of the wiper blade, each clamping seat comprising a pair of clipping plates connected with each other and clamped by the pair of outer buckling brackets, the pair of clipping plates respectively comprising a protruding thorn protruding horizontally and facing each other, the pair of clipping plates inserted in the first slots on the two sides of the central column from one end of the wiper blade to abut against the pair of the elastic sheets, and the protruding thorn of each clipping plate inserted in the central column;
 wherein each clamping seat further comprises a baffle and a pair of side plates all perpendicularly connected to the pair of clipping plates, the baffle is connected to one end of the pair of clipping plates, and the pair of side plates are located on two outer sides of the pair of clipping plates opposite to each other;

wherein the each clamping seat further comprises a pair of buckling plates arranged perpendicularly to the baffle; a buckling slot is defined on each side plate; and one end of each buckling plate is connected to the baffle, and another end of the each buckling plate is clamped in the buckling slot.

2. The windshield wiper assembly structure according to claim 1, wherein two snapping holes are respectively defined on two ends of the each elastic sheet on a side away from the central column, and each clipping plate comprises a blocking portion engaged in each snapping hole.

3. The windshield wiper assembly structure according to claim 2, wherein the blocking portion comprises a tab extending obliquely from a surface of each clipping plate toward each elastic sheet (30).

4. The windshield wiper assembly structure according to claim 1, wherein a notch is defined on a side of each clipping plate, and each outer buckling bracket is fastened to the notch of each clipping plate.

5. The windshield wiper assembly structure according to claim 4, wherein each clipping plate comprises a hook located on an end thereof and adjacent to the notch.

6. The windshield wiper assembly structure according to claim 1, wherein a recess is defined on one side of one of multiple protruding thorns of one of the clipping plates and adjacent to another one of the protruding thorns of another one of the clipping plates.

7. The windshield wiper assembly structure according to claim 1, wherein the penetrating portion comprises two second slots respectively defined on two sides of the central column, the second slot is located between the first slot and the scraping portion, and each buckling plate is located in the second slot.

8. A windshield wiper assembly structure, comprising:
a wiper holder, comprising a main frame and a pair of outer buckling brackets connected to the main frame, each outer buckling bracket comprising a through groove and an opening communicating to the through groove;
a wiper blade, comprising a penetrating portion and a scraping portion connected to the penetrating portion, the penetrating portion inserted in multiple through grooves of the pair of the outer buckling brackets, a pair of first slots defined on the penetrating portion, and the scraping portion protruding from the opening;
a pair of elastic sheets, respectively inserted in the first slots, one side of each elastic sheet attached to the wiper blade, and another side of the each elastic sheet abutting against the pair of outer buckling brackets; and
a pair of clamping seats, fixed on two ends of the wiper blade, each clamping seat comprising a pair of clipping plates clamped by the pair of the outer buckling brackets, a baffle and a pair of side plates connected to the pair of clipping plates, and a pair of buckling plates extended perpendicularly to the baffle, the pair of clipping plates inserted in the first slots from one end of the wiper blade to abut against the pair of the elastic sheets, the baffle connected to one end of the pair of clipping plates, a buckling slot defined on each side plate, one end of each buckling plate connected to the baffle, and another end of the each buckling plate clamped in the buckling slot.

9. The windshield wiper assembly structure according to claim 8, wherein two snapping holes are respectively defined on two ends of each elastic sheet, and each clipping plate comprises a blocking portion engaged in the snapping hole.

10. The windshield wiper assembly structure according to claim 9, wherein the blocking portion comprises a tab extending obliquely from a surface of the each clipping plate toward the each elastic sheet.

11. The windshield wiper assembly structure according to claim 8, wherein a notch is defined on a side of each clipping plate, and each outer buckling bracket is fastened to the notch of each clipping plate.

12. The windshield wiper assembly structure according to claim 11, wherein each clipping plate comprises a hook located on an end thereof and adjacent to the notch.

13. The windshield wiper assembly structure according to claim 8, wherein the pair of clipping plates respectively comprises a protruding thorn protruding horizontally and facing each other, and a recess is defined on one side of one of multiple protruding thorns of one of the clipping plates and adjacent to another one of the protruding thorns of another one of the clipping plates.

* * * * *